(12) United States Patent
Woo et al.

(10) Patent No.: US 11,251,465 B2
(45) Date of Patent: Feb. 15, 2022

(54) ORGANIC ELECTROLYTE AND LITHIUM BATTERY EMPLOYING SAID ELECTROLYTE

(71) Applicant: Samsung SDI Co., Ltd., Yongin-si (KR)

(72) Inventors: Myung Heui Woo, Yongin-si (KR); Soo Jin Kim, Yongin-si (KR); Si Young Cha, Yongin-si (KR); Woo Cheol Shin, Yongin-si (KR); Ha Rim Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 552 days.

(21) Appl. No.: 15/309,318

(22) PCT Filed: May 8, 2014

(86) PCT No.: PCT/KR2014/004079
§ 371 (c)(1),
(2) Date: Nov. 7, 2016

(87) PCT Pub. No.: WO2015/170786
PCT Pub. Date: Nov. 12, 2015

(65) Prior Publication Data
US 2017/0069936 A1    Mar. 9, 2017

(51) Int. Cl.
*H01M 10/0567* (2010.01)
*H01M 10/0568* (2010.01)
(Continued)

(52) U.S. Cl.
CPC ....... *H01M 10/0567* (2013.01); *H01M 4/131* (2013.01); *H01M 4/133* (2013.01);
(Continued)

(58) Field of Classification Search
CPC .......... H01M 10/0567; H01M 10/052; H01M 10/0525; H01M 10/0568; H01M 10/0569;
(Continued)

(56) References Cited

U.S. PATENT DOCUMENTS

| 2002/0081496 A1 | 6/2002 | Tsujioka et al. |
| 2007/0275306 A1 | 11/2007 | Lee et al. |

(Continued)

FOREIGN PATENT DOCUMENTS

| CN | 101079503 A | 11/2007 |
| CN | 103259043 A | 5/2013 |

(Continued)

OTHER PUBLICATIONS

English translation of JP 2013020789 (Year: 2013).*

(Continued)

*Primary Examiner* — Bethany L Martin
*Assistant Examiner* — Kourtney R S Carlson
(74) *Attorney, Agent, or Firm* — Lewis Roca Rothgerber Christie LLP

(57) ABSTRACT

Provided are an organic electrolytic solution and a lithium battery including the organic electrolytic solution, wherein the organic electrolytic solution includes an organic solvent, a lithium salt, a borate compound represented by Formula 1 below, and an ionic metal complex represented by Formula 2 below:

<Formula 1>

(Continued)

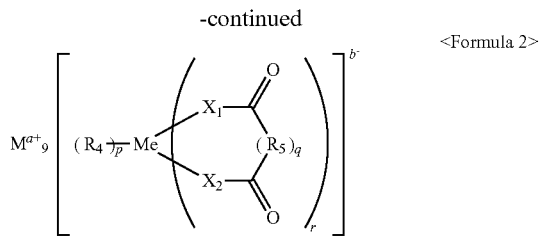

<Formula 2> wherein $R_1$, $R_2$, and $R_3$ are each independently a hydrogen; a $C_1$-$C_5$ alkyl group substituted or unsubstituted with a halogen; or a $C_1$-$C_5$ cyanoalkyl group substituted or unsubstituted with a halogen, at least one of the $R_1$, $R_2$, and $R_3$ includes a cyanoalkyl group, Me is an element selected from the group consisting of transition metals and Groups 13 to 15 elements of the periodic table, M is a metal ion, a is an integer from 1 to 3, b is an integer from 1 to 3, s=b/a, p is an integer from 0 to 8, q is 0 or 1, r is an integer from 1 to 4, $X_1$ and $X_2$ are each independently O, S, or $NR_6$, $R_4$ and $R_6$ are each independently a halogen, a $C_1$-$C_5$ alkyl group substituted or unsubstituted with a halogen, or a $C_1$-$C_5$ aryl group substituted or unsubstituted with a halogen, and $R_5$ is a $C_1$-$C_5$ alkylene group substituted or unsubstituted with a halogen or a $C_4$-$C_{10}$ arylene group substituted or unsubstituted with a halogen.

18 Claims, 4 Drawing Sheets

(51) Int. Cl.
| | |
|---|---|
| *H01M 10/052* | (2010.01) |
| *H01M 10/0525* | (2010.01) |
| *H01M 10/0569* | (2010.01) |
| *H01M 50/411* | (2021.01) |
| *H01M 50/431* | (2021.01) |
| *H01M 50/449* | (2021.01) |
| *H01M 4/131* | (2010.01) |
| *H01M 4/133* | (2010.01) |
| *H01M 4/505* | (2010.01) |
| *H01M 4/525* | (2010.01) |
| *H01M 4/587* | (2010.01) |
| *H01M 4/62* | (2006.01) |
| *H01M 4/66* | (2006.01) |
| *H01M 4/04* | (2006.01) |
| *H01M 4/1391* | (2010.01) |
| *H01M 4/1393* | (2010.01) |
| *H01M 4/02* | (2006.01) |

(52) U.S. Cl.
CPC ........... *H01M 4/505* (2013.01); *H01M 4/525* (2013.01); *H01M 4/587* (2013.01); *H01M 4/623* (2013.01); *H01M 4/625* (2013.01); *H01M 4/661* (2013.01); *H01M 10/052* (2013.01); *H01M 10/0525* (2013.01); *H01M 10/0568* (2013.01); *H01M 10/0569* (2013.01); *H01M 50/411* (2021.01); *H01M 50/431* (2021.01); *H01M 50/449* (2021.01); *H01M 4/0404* (2013.01); *H01M 4/0409* (2013.01); *H01M 4/0435* (2013.01); *H01M 4/0471* (2013.01); *H01M 4/1391* (2013.01); *H01M 4/1393* (2013.01); *H01M 2004/021* (2013.01); *H01M 2004/027* (2013.01); *H01M 2004/028* (2013.01); *H01M 2220/30* (2013.01); *H01M 2300/004* (2013.01)

(58) Field of Classification Search
CPC ............. H01M 2/1646; H01M 2/1653; H01M 2/1686; H01M 4/131; H01M 4/133; H01M 4/505; H01M 4/525; H01M 4/587; H01M 4/623; H01M 4/625; H01M 4/661; H01M 4/0404; H01M 4/0409; H01M 4/0435; H01M 4/0471; H01M 4/1391; H01M 4/1393
USPC ....................................................... 429/332
See application file for complete search history.

(56) References Cited

U.S. PATENT DOCUMENTS

| | | |
|---|---|---|
| 2007/0292766 A1 | 12/2007 | Yamaguchi et al. |
| 2008/0118845 A1 | 5/2008 | Ihara et al. |
| 2010/0028785 A1 | 2/2010 | Choi et al. |
| 2010/0209782 A1 | 8/2010 | Choi et al. |
| 2012/0196187 A1* | 8/2012 | Fujinami ............. H01M 10/052 429/303 |
| 2012/0288751 A1 | 11/2012 | Kako et al. |
| 2013/0230770 A1 | 9/2013 | Oya et al. |
| 2014/0155566 A1 | 6/2014 | Ignatyen et al. |

FOREIGN PATENT DOCUMENTS

| | | |
|---|---|---|
| EP | 2 065 339 A1 | 6/2009 |
| JP | 2002-373703 | 12/2002 |
| JP | 2009-21102 A | 1/2009 |
| JP | 2012-174546 A | 9/2012 |
| JP | 2012174546 A * | 9/2012 |
| JP | 2013020789 A * | 1/2013 |
| JP | 2013-222612 A | 10/2013 |
| KR | 10-2007-0119515 | 12/2007 |
| KR | 10-2008-0046562 | 5/2008 |
| KR | 10-2010-0012761 | 2/2010 |
| KR | 10-2012-0080154 | 7/2012 |
| KR | 10-2012-0127248 | 11/2012 |
| KR | 10-2014-0050058 | 4/2014 |
| WO | WO 2007/109435 A2 | 9/2007 |
| WO | WO 2012/133556 A1 | 10/2012 |
| WO | WO-2013010641 A1 * | 1/2013 ................ C07F 5/02 |

OTHER PUBLICATIONS

English machine translation of Oishi JP-2012174546-A (Year: 2012).*
Japanese Office Action dated Feb. 27, 2018, for corresponding Japanese Patent Application No. 2016-566894 (5 pages).
SIPO Office Action, with English translation of the substantial part, dated Jul. 30, 2018, for corresponding Chinese Patent Application No. 201480078688.3 (8 pages).
International Search corresponding to PCT/KR2014/004079, dated Jan. 28, 2015, 4 pages.
EPO Extended Search Report dated Oct. 10, 2017, for corresponding European Patent Application No. 14891567.1 (7 pages).
Tanaka et al., Electrochemical Properties of a Mixed Boric Ester as a Novel Electrolyte Solvent, Electrochemistry, 2010, pp. 397-399, vol. 78, No. 5, The Electrochemical Society of Japan.

* cited by examiner

ORGANIC ELECTROLYTE AND LITHIUM BATTERY EMPLOYING SAID ELECTROLYTE

CROSS-REFERENCE TO RELATED APPLICATION(S)

This application is a National Phase Patent Application and claims priority to and the benefit of International Application Number PCT/KR2014/004079, filed on May 8, 2014, the entire contents of which is incorporated herein by reference.

TECHNICAL FIELD

The inventive concept relates to an organic electrolytic solution and a lithium battery including the organic electrolytic solution.

BACKGROUND ART

Lithium batteries are used as a driving power source for portable electronic devices such as video cameras, mobile phones, and notebook computers. Rechargeable lithium secondary batteries have a energy density per unit weight that is three times or higher than conventional lead-acid batteries, nickel-cadmium batteries, nickel-hydrogen batteries, and nickel-zinc batteries, and are capable of high-speed charging.

Lithium batteries operate at a high driving voltage, and thus an aqueous electrolyte, which is highly reactive to lithium, cannot be used. Generally, an organic electrolytic solution is used in lithium batteries. An organic electrolytic solution is prepared by dissolving a lithium salt in an organic solvent. An organic solvent that has high ion conductivity, a high dielectric constant, and low viscosity, while also being stable at a high voltage, is preferred.

When a carbonate-based polar non-aqueous solvent is used in lithium batteries, an irreversible reaction may occur during an initial charging process, in which an excessive amount of electric charge is consumed due to a side reaction between a cathode/anode and an electrolytic solution. As a result of the irreversible reaction, passivation layers such as a solid electrolyte interface (hereinafter "SEI") may be formed on a surface of the anode.

A lithium salt reacts with an organic solvent in an electrolytic solution during charge and discharge processes, and consumes the organic solvent, produces gas, and forms a solid electrolyte interface having high resistance, and thus, degrades lifespan characteristics of lithium batteries.

Accordingly, an organic solid electrolytic solution capable of inhibiting gas production and forming a solid electrolytic interfaces having low resistance is needed to prevent degradation of lifespan characteristics of lithium batteries.

DETAILED DESCRIPTION OF THE INVENTIVE CONCEPT

Technical Problem

The inventive concept provides a novel organic electrolytic solution.

The inventive concept provides a lithium battery including the organic electrolytic solution.

Technical Solution

According to an aspect of the inventive concept, there is provided an organic electrolytic solution including:
an organic solvent;
a lithium salt;
a borate compound represented by Formula 1 below; and
an ionic metal complex represented by Formula 2 below:

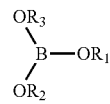
<Formula 1>

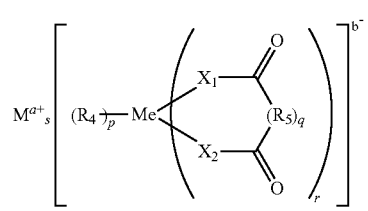
<Formula 2> wherein, in Formulae 1 and 2 above,
$R_1$, $R_2$, and $R_3$ may each independently be a hydrogen; a $C_1$-$C_5$ alkyl group substituted or unsubstituted with a halogen; or a $C_1$-$C_5$ cyanoalkyl group substituted or unsubstituted with a halogen,
wherein at least one of the $R_1$, $R_2$, and $R_3$ may include a cyanoalkyl group,
Me may be an element selected from the group consisting of transition metals and Groups 13 to 15 elements of the periodic table,
M may be a metal ion,
a may be an integer from 1 to 3, b may be an integer from 1 to 3, s=b/a,
p may be an integer from 0 to 8, q may be 0 or 1, r may be an integer from 1 to 4,
$X_1$ and $X_2$ may each independently be O, S, or $NR_6$,
$R_4$ and $R_6$ may each independently be a halogen, a $C_1$-$C_5$ alkyl group substituted or unsubstituted with a halogen, or a $C_1$-$C_5$ aryl group substituted or unsubstituted with a halogen, and
$R_5$ may be a $C_1$-$C_5$ alkylene group substituted or unsubstituted with a halogen or a $C_4$-$C_{10}$ arylene group substituted or unsubstituted with a halogen.

According to another aspect of the inventive concept, there is provided a lithium battery including:
a cathode;
an anode; and
the organic electrolytic solution.

Advantageous Effects

According to an aspect of the inventive concept, when an organic electrolytic solution having a novel composition is used, lifespan characteristics of lithium batteries may be improved.

BEST MODE

Figure 1A:
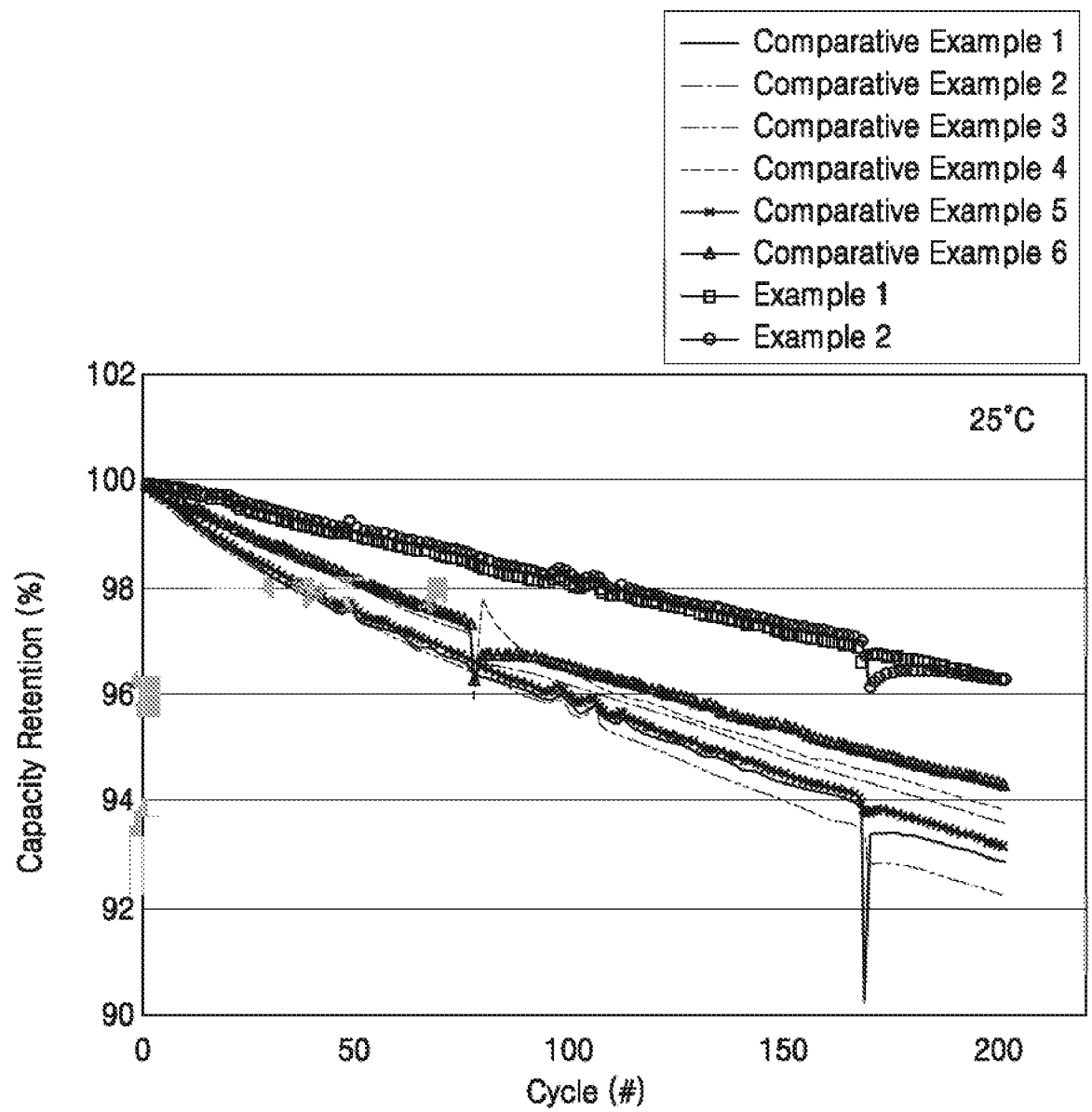
FIG. 1A is a graph showing lifespan characteristics of lithium batteries prepared in Examples 1 and 2 and Comparative Examples 1 through 6 at room temperature (25° C.)

Hereinafter, an organic electrolytic solution and a lithium battery including the organic electrolytic solution will be described in detail with reference to the example embodiments.

According to an example embodiment, the organic electrolytic solution may include an organic solvent; a lithium salt; a borate compound represented by Formula 1 below; and an ionic metal complex represented by Formula 2 below:

<Formula 1>

$$\begin{array}{c} OR_3 \\ \diagdown \\ B-OR_1 \\ \diagup \\ OR_2 \end{array}$$

<Formula 2>

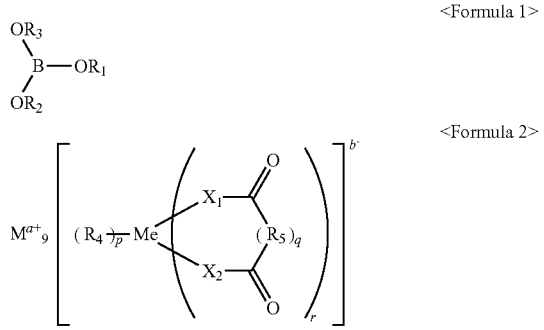

In Formulae 1 and 2 above, $R_1$, $R_2$, and $R_3$ may each independently be a hydrogen; a $C_1$-$C_5$ alkyl group substituted or unsubstituted with a halogen; or a $C_1$-$C_5$ cyanoalkyl group substituted or unsubstituted with a halogen, wherein at least one of $R_1$, $R_2$, and $R_3$ may include a cyanoalkyl group, Me may be an element selected from the group consisting of transition metals and Groups 13 to 15 elements in the periodic table, M may be a metal ion, a may be an integer from 1 to 3, b may be an integer from 1 to 3, s=b/a, p may be an integer from 0 to 8, q may be 0 or 1, r may be an integer from 1 to 4, $X_1$ and $X_2$ may each independently be O, S, or $NR_6$, $R_4$ and $R_6$ may each independently be a halogen, a $C_1$-$C_5$ alkyl group substituted or unsubstituted with a halogen, or a $C_1$-$C_5$ aryl group substituted or unsubstituted with a halogen, $R_5$ may be a $C_1$-$C_5$ alkylene group substituted or unsubstituted with a halogen or a $C_4$-$C_{10}$ arylene group substituted or unsubstituted with a halogen. For example, M may be an alkali metal ion or an alkaline earth metal ion.

The organic electrolytic solution may inhibit production of gas and a solid electrolytic interface having high resistance, and thus, it may prevent degradation of battery performance, such as lifespan characteristics of a lithium battery.

The principle of the organic electrolytic solution improving lithium battery performance will be explained in detail, but this explanation is provided only to aid understanding of the present inventive concept and does not limit the scope of the present inventive concept thereto.

For example, the borate compound may accommodate a negative ion which promotes dissociation of a lithium salt, and thus ion conductivity of the organic electrolytic solution may improve. Further, in the ionic metal complex in Formula 2 above, heteroatoms, which are represented as $X_1$ and $X_2$, may form a ring and link to a central atom, which is represented as Me, and thus a chemically stable structure may be formed. Accordingly, the organic electrolytic solution including the ionic metal complex may have improved heat resistance, chemical stability, and hydrolysis resistance, in addition to improved ion conductivity.

In this regard, when the organic electrolytic solution simultaneously includes the borate compound and the ionic compound, high ion conductivity, improved heat resistance, and hydrolysis resistance may be simultaneously provided. As a result, a lithium battery including the organic electrolytic solution may have improved stability and lifespan characteristics.

For example, in the organic electrolytic solution, the borate compound may be represented by Formula 3 below:

<Formula 3>

In Formula 3 above, $R_{10}$ may be a $C_1$-$C_5$ cyanoalkyl group substituted or unsubstituted with a halogen.

For example, in the organic electrolytic solution, the borate compound may be tricyanomethylborate, tricyanoethylborate (tris(2-cyanoethyl)borate), tricyanopropylborate or tricyanobutylborate, but embodiments are not limited thereto and any borate compound that is a Lewis acid and capable of accommodating a negative ion may be used.

For example, in the organic electrolytic solution, the ionic metal complex may be represented by Formula 4 below:

<Formula 4>

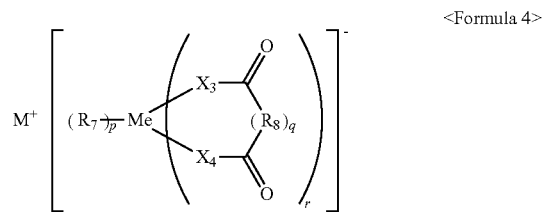

In Formula 4 above, $M_a$ may be Al, B, or P, M may be a metal ion, p may be an integer from 0 to 8, q may be 0 or 1, r may be an integer from 1 to 4, $X_3$ and $X_4$ may each independently be O or S, $R_7$ may be a halogen, and $R_8$ may be a $C_1$-$C_5$ alkylene group substituted or unsubstituted a halogen or a $C_4$-$C_{10}$ arylene group substituted or unsubstituted with a halogen.

For example, in the organic electrolytic solution, the ionic metal complex may be represented by Formula 5 or 6 below:

<Formula 5>

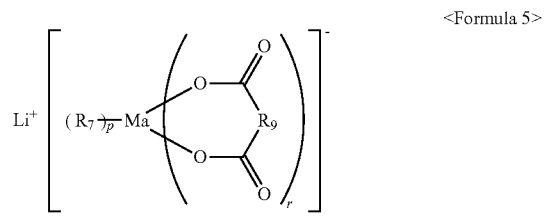

<Formula 6>

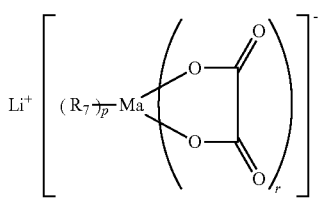

<Formula 12>

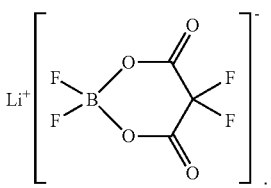

In Formulae 5 and 6 above, $M_a$ may be Al, B, or P, p may be an integer from 0 to 8, r may be an integer from 1 to 4, $R_7$ may be a halogen, $R_9$ may be a $C_1$-$C_5$ alkylene group substituted or unsubstituted with a halogen.

For example, in the organic electrolytic solution, the ionic metal complex may be represented by one of Formulae 7 to 12 below.

<Formula 7>

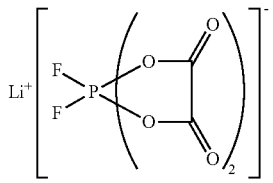

<Formula 8>

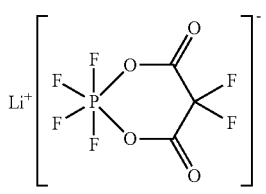

<Formula 9>

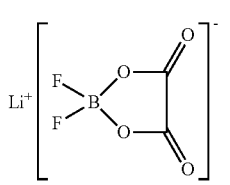

<Formula 10>

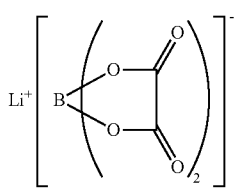

<Formula 11>

In the organic electrolytic solution, an amount of the borate compound may be about 0.1 weight % to about 10 weight % based on the total weight of the organic electrolytic solution, but the amount is not limited thereto and may be adjusted to an appropriate according to the need. For example, in the organic electrolytic solution, the amount of the borate compound may be about 0.1 weight % to about 7 weight %/o based on the total weight of the organic electrolytic solution. For example, in the organic electrolytic solution, the amount of the borate compound may be about 0.1 weight % to about 5 weight % based on the total weight of the organic electrolytic solution. For example, in the organic electrolytic solution, the amount of the borate compound may be about 0.1 weight % to about 3 weight % based on the total weight of the organic electrolytic solution. Further improved battery characteristics may be obtained when the amount of the borate compound is in the ranges described above.

In the organic electrolytic solution, an amount of the ionic metal complex may be about 0.1 weight % to about 10 weight % based on the total weight of the organic electrolytic solution, but the amount is not limited thereto and may be adjusted to an appropriate according to the need. For example, in the organic electrolytic solution, the amount of the ionic metal complex may be about 0.1 weight % to about 7 weight % based on the total weight of the organic electrolytic solution. For example, in the organic electrolytic solution, the amount of the ionic metal complex may be about 0.1 weight % to about 5 weight % based on the total weight of the organic electrolytic solution. For example, in the organic electrolytic solution, the amount of the ionic metal complex may be about 0.1 weight % to about 3 weight % based on the total weight of the organic electrolytic solution. Further improved battery characteristics may be obtained when the amount of the ionic metal complex is in the ranges described above.

The organic electrolytic solution may further include a fluorine-based compound represented by Formula 13 below:

<Formula 13>

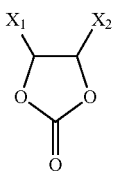

In Formula 13 above, $X_1$ and $X_2$ may each independently be a hydrogen; a halogen; a $C_1$-$C_2$ alkyl group substituted or unsubstituted with a halogen, wherein at least one of the $X_1$ and $X_2$ may include a fluorine atom.

As the organic electrolytic solution includes an additional fluorine-based compound, viscosity of the organic electrolytic solution may decrease. When the viscosity of the organic electrolytic solution decreases, impregnation characteristics and ion conductivity of the organic electrolytic solution may improve.

In the organic electrolytic solution, the fluorine-based compound may be represented by one of Formulae 14 and 15:

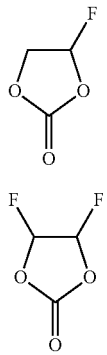

<Formula 14>

<Formula 15>

In the organic electrolytic solution, an amount of the fluorine-based compound may be about 0.1 weight % to about 10 weight % based on the total amount of the organic electrolytic solution, but the amount is not limited thereto and may be adjusted to an appropriate amount according to the need. For example, in the organic electrolytic solution, the amount of the fluorine-based compound may be about 0.1 weight % to about 7 weight % based on the total amount of the organic electrolytic solution. For example, in the organic electrolytic solution, the amount of the fluorine compound may be about 0.1 weight % to about 5 weight % based on the total amount of the organic electrolytic solution. For example, in the organic electrolytic solution, the amount of the fluorine compound may be about 0.1 weight % to about 3 weight % based on the total amount of the organic electrolytic solution. When the amount of the fluorine compound is in the above ranges, a lithium battery may have improved battery characteristics.

In the organic electrolytic solution, a ratio of the borate compound, ionic metal complex, and fluorine-based compound may be about 20 parts by weight to about 500 parts by weight of the ionic metal complex and about 20 parts by weight to about 500 parts by weight of the fluorine compound based on 100 parts by weight of the borate compound, but the ratio is not limited thereto and may be adjusted within ranges that do not inhibit the effects of the present inventive concept. For example, in the organic electrolytic solution, a ratio of the borate compound, ionic metal complex, and fluorine-based compound may be about 20 parts by weight to about 400 parts by weight of the ionic metal complex and about 20 parts by weight to about 400 parts by weight of the fluorine compound based on 100 parts by weight of the borate compound. For example, in the organic electrolytic solution, a ratio of the borate compound, ionic metal complex, and fluorine-based compound may be about 20 parts by weight to about 300 parts by weight of the ionic metal complex and about 20 parts by weight to about 300 parts by weight of the fluorine compound based on 100 parts by weight of the borate compound.

In the organic electrolytic solution, the organic solvent may include a low boiling point solvent. The low-boiling-point solvent refers to a solvent having a boiling point of about 200° C. or less at a temperature of about 25° C. and pressure of about 1 atm.

For example, the organic solvent may include one or more selected from the group consisting of dialkyl carbonate, cyclic carbonate, linear or cyclic ester, linear or cyclic amide, aliphatic nitrile, linear or cyclic ether, and derivatives thereof.

In particular, the organic solvent may include one or more selected from the group consisting of dimethyl carbonate (DMC), ethyl methyl carbonate (EMC), methyl propyl carbonate, ethyl propyl carbonate, diethyl carbonate (DEC), dipropyl carbonate, propylene carbonate (PC), ethylene carbonate (EC), butylene carbonate, ethyl propionate, ethyl butyrate, acetonitrile, succinonitrile (SN), dimethyl sulfoxide, dimethylformamide, dimethylacetamide, gamma-valerolactone, gamma-butyrolactone and tetrahydrofuran, but embodiments are not limited thereto and any material available as a low-boiling-point solvent in the art may be used.

In the organic electrolytic solution, a concentration of the lithium salt may be about 0.01 M to about 2.0 M, but embodiments are not limited thereto and any suitable amount may be used according to the need. When a concentration of the lithium salt is within this range, the lithium batteries may have improved battery characteristics.

The lithium salt used in the organic electrolytic solution is not particularly limited and any material available as a lithium salt in the art may be used. For example, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are selected from 1 to 20), LiCl, LiI, or a mixture thereof may be used. For example, in the organic electrolytic solution, the lithium salt may be $LiPF_6$.

The organic electrolytic solution may be liquid or gel. The organic electrolytic solution may be prepared by adding the borate compound, ionic metal complex, and lithium salt described above to the organic solvent.

A lithium battery according to another example embodiment may include a cathode, an anode, and the organic electrolytic solution described above. The lithium battery is not particularly limited in structure, and the lithium battery may be a lithium secondary battery such as a lithium ion battery, a lithium ion polymer battery, a lithium sulfur battery as well as a lithium primary battery.

For example, in the lithium battery above, the cathode may include nickel. For example, a positive active material of the cathode may be a lithium transition metal oxide including nickel. For example, the positive active material of the cathode may be a nickel-rich lithium transition metal oxide having the highest amount of nickel among the transition metals.

For example, in the lithium battery, the anode may include graphite as a negative active material. Also, the lithium battery may have a high voltage of about 4.8 V or higher.

In one or more example embodiments, the lithium battery may be manufactured in the following manner.

First, a cathode is prepared.

For example, a cathode active material, a conducting agent, a binder, and a solvent are mixed to prepare a cathode active material composition. In some example embodiments, the cathode active material composition may be directly coated on a metallic current collector to prepare a cathode plate. In some example embodiments, the cathode active material composition may be cast on a separate support to form a cathode active material film, which may then be separated from the support and laminated on a metallic current collector to prepare a cathode plate. The cathode is not limited to the examples described above, and may be one of a variety of types.

The cathode active material may be any one available in the art, for example, may be a lithium-containing metal oxide. In some example embodiments, the cathode active material may be at least one composite oxide of lithium with a metal selected from among Co, Mn, Ni, and a combination thereof. In some example embodiments, the cathode active material may be a compound represented by one of the following formulae: $Li_aA_{1-b}B'_bD'_2$ (where $0.90 \leq a \leq 1.8$ and $0 \leq b \leq 0.5$); $Li_aE_{1-b}B'_bO_{2-c}D'_c$ (where $0.90 \leq a \leq 1.8$, $0 \leq b \leq 0.5$, and $0 \leq c \leq 0.05$); $LiE_{2-b}B'_bO_{4-c}D'_c$ (where $0 \leq b \leq 0.5$ and $0 \leq c \leq 0.05$); $Li_aNi_{1-b-c}Co_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulae above, A may be selected from nickel (Ni), cobalt (Co), manganese (Mn), and combinations thereof; B' may be selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D' may be selected from oxygen (O), fluorine (F), sulfur (S), phosphorus (P), and combinations thereof; E may be selected from cobalt (Co), manganese (Mn), and combinations thereof; F' may be selected from fluorine (F), sulfur (S), phosphorus (P), and combinations thereof; G may be selected from aluminum (Al), chromium (Cr), manganese (Mn), iron (Fe), magnesium (Mg), lanthanum (La), cerium (Ce), strontium (Sr), vanadium (V), and combinations thereof; Q is selected from titanium (Ti), molybdenum (Mo), manganese (Mn), and combinations thereof; I' may be selected from chromium (Cr), vanadium (V), iron (Fe), scandium (Sc), yttrium (Y), and combinations thereof; and J may be selected from vanadium (V), chromium (Cr), manganese (Mn), cobalt (Co), nickel (Ni), copper (Cu), and combinations thereof.

In some example embodiments, the cathode active material may be $LiCoO_2$, $LiMn_xO_{2x}$ (where $x=1$ or 2), $LiNi_{1-x}Mn_xO_{2x}$ (where $0<x<1$), $LiNi_{1-x-y}Co_xMn_yO_2$ (where $0 \leq x \leq 0.5$, $0 \leq y \leq 0.5$, and $1-x-y>0.5$), or $LiFePO_4$.

The compounds listed above as cathode active materials may have a surface coating layer (hereinafter, also referred to as "coating layer"). Alternatively, a mixture of a compound without a coating layer and a compound having a coating layer, the compounds being selected from the compounds listed above, may be used. In some example embodiments, the coating layer may include at least one compound of a coating element selected from the group consisting of oxide, hydroxide, oxyhydroxide, oxycarbonate, and hydroxycarbonate of the coating element. In some example embodiments, the compounds for the coating layer may be amorphous or crystalline. In some example embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In some example embodiments, the coating layer may be formed using any method that does not adversely affect the physical properties of the cathode active material when a compound of the coating element is used. For example, the coating layer may be formed using a spray coating method or a dipping method. The coating methods may be well understood by one of ordinary skill in the art, and thus a detailed description thereof will be omitted.

In some example embodiments, the conducting agent may be carbon black or graphite particulates, but example embodiments are not limited thereto. Any material available as a conducting agent in the art may be used.

Examples of the binder are a vinylidene fluoride/hexafluoropropylene copolymer, polyvinylidene fluoride (PVDF), polyacrylonitrile, polymethylmethacrylate, polytetrafluoroethylene, mixtures thereof, and a styrene-butadiene rubber polymer, but example embodiments are not limited thereto. Any material available as a binding agent in the art may be used.

Examples of the solvent are N-methyl-pyrrolidone, acetone, and water, but example embodiments are not limited thereto. Any material available as a solvent in the art may be used.

The amounts of the cathode active material, the conducting agent, the binder, and the solvent may be in ranges that are commonly used in lithium batteries. At least one of the conducting agent, the binder, and the solvent may be omitted according to the use and the structure of the lithium battery.

Next, an anode is prepared.

For example, an anode active material, a conducting agent, a binder, and a solvent are mixed to prepare an anode active material composition. In some example embodiments, the anode active material composition may be directly coated on a metallic current collector and dried to prepare an anode plate. In some example embodiments, the anode active material composition may be cast on a separate support to form an anode active material film, which may then be separated from the support and laminated on a metallic current collector to prepare an anode plate.

In some example embodiments, the anode active material may be any anode active material for a lithium battery available in the art. For example, the anode active material may include at least one selected from lithium metal, a metal alloyable with lithium, a transition metal oxide, a non-transition metal oxide, and a carbonaceous material.

Examples of the metal alloyable with lithium are Si, Sn, Al, Ge, Pb, Bi, Sb, a Si—Y alloy (where Y is an alkali metal, an alkali earth metal, a Group XIII element, a Group XIV element, a transition metal, a rare earth element, or a combination thereof, and Y is not Si), and a Sn—Y alloy (where Y is an alkali metal, an alkali earth metal, a Group XIII element, a Group XIV element, a transition metal, a rare earth element, or a combination thereof, and Y is not Sn). In some example embodiments, Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof.

Examples of the transition metal oxide include a lithium titanium oxide, a vanadium oxide, and a lithium vanadium oxide.

Examples of the non-transition metal oxide include $SnO_2$ and $SiO_x$ (where $0<x<2$).

Examples of the carbonaceous material are crystalline carbon, amorphous carbon, and mixtures thereof. An example of the crystalline carbon is graphite, such as natural graphite or artificial graphite, in shapeless, plate, flake, spherical, or fibrous form. Examples of the amorphous carbon are soft carbon (carbon sintered at low temperatures), hard carbon, meso-phase pitch carbides, and sintered cokes.

In some example embodiments, the conducting agent, the binder, and the solvent used for the anode active material composition may be the same as those used for the cathode active material composition.

The amounts of the anode active material, the conducting agent, the binder, and the solvent may be the same as those generally used in the art for lithium batteries. At least one of the conducting agent, the binder, and the solvent may be omitted according to the use and the structure of the lithium battery.

Next, a separator to be disposed between the cathode and the anode is prepared.

The separator for the lithium battery may be any separator commonly used in lithium batteries. In some example embodiments, the separator may have low resistance to migration of ions in an electrolyte and have an excellent electrolyte-retaining ability. Examples of the separator are glass fiber, polyester, Teflon, polyethylene, polypropylene, polytetrafluoroethylene (PTFE), and a combination thereof, each of which may be a non-woven or woven fabric. For example, a rollable separator including polyethylene or polypropylene may be used for a lithium ion battery. A separator with a good organic electrolytic solution-retaining ability may be used for a lithium ion polymer battery. For example, the separator may be manufactured in the following manner.

In some example embodiments, a polymer resin, a filler, and a solvent may be mixed together to prepare a separator composition. Then, the separator composition may be directly coated on an electrode, and then dried to form the separator. In some example embodiments, the separator composition may be cast on a support and then dried to form a separator film, which may then be separated from the support and laminated on an electrode to form the separator.

The polymer resin used to manufacture the separator may be any material commonly used as a binder for electrode plates. Examples of the polymer resin are a vinylidenefluoride/hexafluoropropylene copolymer, polyvinylidene fluoride (PVDF), polyacrylonitrile, polymethylmethacrylate, and a mixture thereof.

Next, the organic electrolyte solution is prepared.

Figure 2:
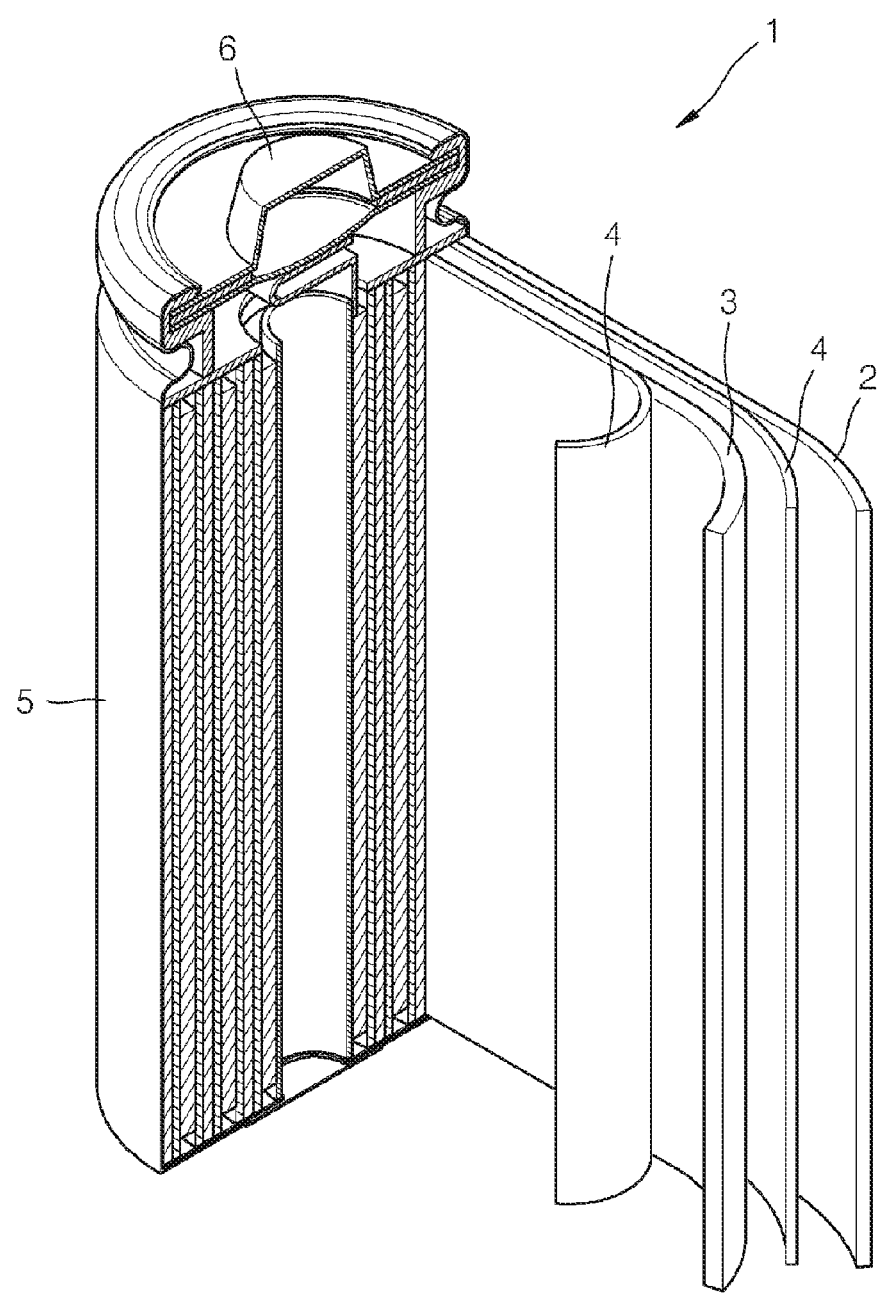
FIG. 2 is a schematic view of a lithium battery according to an example embodiment.

Referring to FIG. 2, a lithium battery 1 includes a cathode 3, an anode 2, and a separator 4. In some example embodiments, the cathode 3, the anode 2, and the separator 4 may be wound or folded, and then sealed in a battery case 5. In some example embodiments, the battery case 5 may be filled with an organic electrolytic solution and sealed with a cap assembly 6, thereby completing the manufacture of the lithium battery 1. In some example embodiments, the battery case 5 may be a cylindrical type, a rectangular type, or a thin-film type. For example, the lithium battery 1 may be a thin-film type battery. In some example embodiments, the lithium battery 1 may be a lithium ion battery.

In some example embodiments, the separator may be disposed between the cathode and the anode to form a battery assembly. In some example embodiments, the battery assembly may be stacked in a bi-cell structure and impregnated with the organic electrolytic solution. In some example embodiments, the resultant assembly may be put into a pouch and hermetically sealed, thereby completing the manufacture of a lithium ion polymer battery.

In one or more example embodiments, a plurality of battery assemblies may be stacked to form a battery pack, which may be used in any device that requires high capacity and high output. For example, the battery pack may be used in a laptop computer, a smartphone, or an electric vehicle.

The lithium battery may have improved lifetime characteristics and high-rate characteristics, and thus may be used in an electric vehicle (EV). For example, the lithium battery may be used in a hybrid vehicle such as a plug-in hybrid electric vehicle (PHEV). The lithium battery may be applicable to the high-power storage field. For example, the lithium battery may be used in an electric bicycle or a power tool.

Mode of the Inventive Concept

Hereinafter, the present inventive concept will be described below in further detail through Examples and Comparative Examples. However, such Examples are for illustrative purposes only and do not limit the scope of the present inventive concept.

Preparation of Organic Electrolytic Solution

Example 1

LDFOP (1%)+TCEB (1%)

An organic electrolytic solution was prepared by using 1.15 M of $LiPF_6$ as a lithium salt and adding 1 weight % of lithium difluoro bis-(oxalato)phosphate (LDFOP), which is a metal salt represented by Formula 8 below, and 1 weight % of tris(2-cyanoethyl) borate (TCEB) represented by Formula 16 below with respect to the total weight of the organic electrolytic solution to a mixed solvent of ethylene carbonate (EC), ethyl methyl carbonate (EMC), and dimethyl carbonate (DMC) in a volume ratio of 2:4:4.

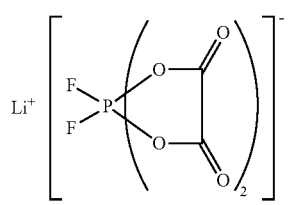

<Formula 8>

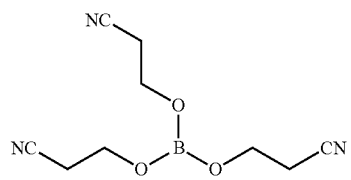

<Formula 16>

Example 2

LDFOP (1%)+TCEB (1%)+FEC (1%)

An organic electrolytic solution was prepared by using 1.15 M of LiPF$_6$ as a lithium salt and adding 1 weight % of a metal salt represented by Formula 8 below, 1 weight % of tris(2-cyanoethyl) borate represented by Formula 16 below, and 1 weight % of fluoroethylene carbonate represented by Formula 14 below with respect to the total weight of the organic electrolytic solution to a mixed solvent of ethylene carbonate (EC), ethyl methyl carbonate (EMC), and dimethyl carbonate (DMC) in a volume ratio of 2:4:4.

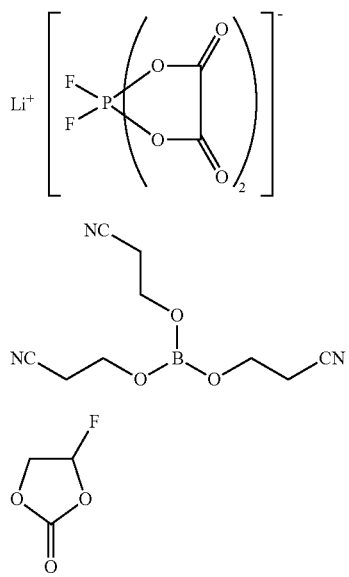

<Formula 8>

<Formula 16>

<Formula 14>

Example 3

LDFOP (1%)+TCEB (0.5%)+FEC (1%)

An organic electrolytic solution was prepared in the same manner as in Example 2, except that 1 weight % of a metal salt represented by Formula 8, 0.5 weight % of tris(2-cyanoethyl) borate represented by Formula 16, and 1 weight % of fluoroethylene carbonate represented by Formula 14 were added to the mixed solvent.

Example 4

LDFOP (1%)+TCEB (0.25%)+FEC (1%)

An organic electrolytic solution was prepared in the same manner as in Example 2, except 1 weight % of a metal salt represented by Formula 8, 0.25 weight % of tris(2-cyanoethyl) borate represented by Formula 16, and 1 weight % of fluoroethylene carbonate represented by Formula 14 were added to the mixed solvent.

Example 5

LDFOP (1%)+TCEB (0.5%)+FEC (3%)

An organic electrolytic solution was prepared in the same manner as in Example 2, except that 1 weight % of a metal salt represented by Formula 8, 0.5 weight % of tris(2-cyanoethyl) borate represented by Formula 16, and 3 weight % of fluoroethylene carbonate represented by Formula 14 were added to the mixed solvent.

Example 6

LDFOP (1%)+TCEB (0.5%)+FEC (0.5%)

An organic electrolytic solution was prepared in the same manner as in Example 2, except that 1 weight % of a metal salt represented by Formula 8, 0.5 weight % of tris(2-cyanoethyl) borate represented by Formula 16, and 0.5 weight % of fluoroethylene carbonate represented by Formula 14 were added to the mixed solvent.

Example 7

LiFOB (1%)+TCEB (0.5%)

An organic electrolytic solution was prepared by using 1.15 M of LiPF$_6$ as a lithium salt and adding 1 weight % of a metal salt represented by Formula 10 below and 0.5 weight % of tris(2-cyanoethyl) borate represented by Formula 16 below with respect to the total weight of the organic electrolytic solution to a mixed solvent of ethylene carbonate (EC), ethyl methyl carbonate (EMC), and dimethyl carbonate (DMC) in a volume ratio of 2:4:4.

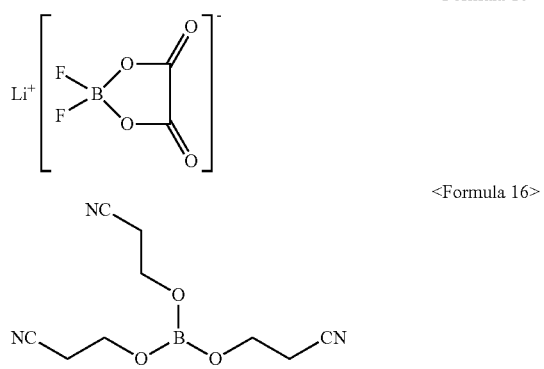

<Formula 10>

<Formula 16>

Example 8

LiFOB (1%)+TCEB (0.5%)+FEC (3%)

An organic electrolytic solution was prepared by using 1.15 M of LiPF$_6$ as a lithium salt and adding 1 weight % of a metal salt represented by Formula 8 below, 0.5 weight % of tris(2-cyanoethyl) borate represented by Formula 16 below, and 3 weight % of fluoroethylene carbonate represented by Formula 14 below with respect to the total weight of the organic electrolytic solution to a mixed solvent of ethylene carbonate (EC), ethyl methyl carbonate (EMC), and dimethyl carbonate (DMC) in a volume ratio of 2:4:4.

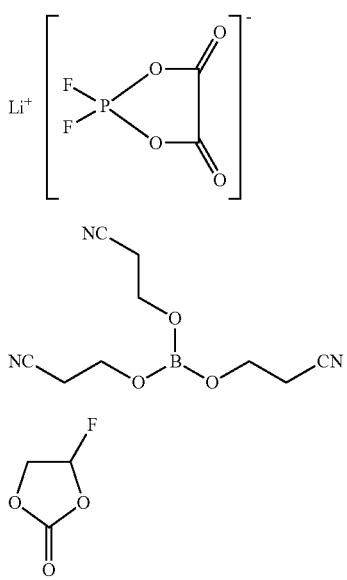

Comparative Example 1

No Additives

An organic electrolytic solution was prepared by adding 1.15 M of LiPF$_6$ as a lithium salt to a mixed solvent of ethylene carbonate (EC), ethyl methyl carbonate (EMC), and dimethyl carbonate (DMC) in a volume ratio of 2:4:4.

Comparative Example 2

LDFOP (1%) Only

An organic electrolytic solution was prepared by using 1.15 M of LiPF$_6$ as a lithium salt and adding 1 weight % of a metal salt represented by Formula 8 below with respect to the total weight of the organic electrolytic solution to a mixed solvent of ethylene carbonate (EC), ethyl methyl carbonate (EMC), and dimethyl carbonate (DMC) in a volume ratio of 2:4:4.

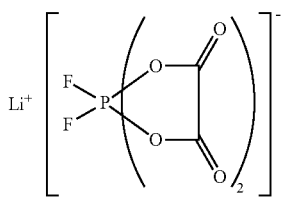

<Formula 8>

Comparative Example 3

TCEB (1%) Only

An organic electrolytic solution was prepared by using 1.15 M of LiPF$_6$ as a lithium salt and adding 1 weight % of tris(2-cyanoethyl) borate represented by Formula 16 below with respect to the total weight of the organic electrolytic solution to a mixed solvent of ethylene carbonate (EC), ethyl methyl carbonate (EMC), and dimethyl carbonate (DMC) in a volume ratio of 2:4:4.

<Formula 16>

Comparative Example 4

FEC (1%) Only

An organic electrolytic solution was prepared by using 1.15 M of LiPF$_6$ as a lithium salt and adding 1 weight % of fluoroethylene carbonate represented by Formula 14 below with respect to the total weight of the organic electrolytic solution to a mixed solvent of ethylene carbonate (EC), ethyl methyl carbonate (EMC), and dimethyl carbonate (DMC) in a volume ratio of 2:4:4.

<Formula 14>

Comparative Example 5

LDFOP (1%)+FEC (1%)

An organic electrolytic solution was prepared by using 1.15 M of LiPF$_6$ as a lithium salt and adding 1 weight % of a metal salt represented by Formula 8 below and 1 weight % of fluoroethylene carbonate represented by Formula 14 below with respect to the total weight of the organic electrolytic solution to a mixed solvent of ethylene carbonate (EC), ethyl methyl carbonate (EMC), and dimethyl carbonate (DMC) in a volume ratio of 2:4:4.

<Formula 8>

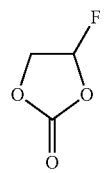

<Formula 14>

Comparative Example 6

TCEB (1%)+FEC (1%)

An organic electrolytic solution was prepared by using 1.15 M of $LiPF_6$ as a lithium salt and adding 1 weight % of tris(2-cyanoethyl) borate represented by Formula 16 below and 1 weight % of fluoroethylene carbonate represented by Formula 14 below with respect to the total weight of the organic electrolytic solution to a mixed solvent of ethylene carbonate (EC), ethyl methyl carbonate (EMC), and dimethyl carbonate (DMC) in a volume ratio of 2:4:4.

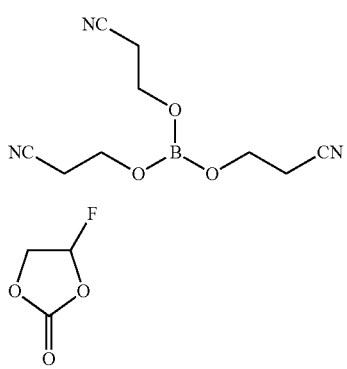

<Formula 16>

<Formula 14>

Comparative Example 7

LDFOP (1%)+VEC (0.5%)

An organic electrolytic solution was prepared by using 1.15 M of $LiPF_6$ as a lithium salt and adding 1 weight % of a metal salt represented by Formula 8 below and 0.5 weight % of vinyl ethylene carbonate (VEC) with respect to the total weight of the organic electrolytic solution to a mixed solvent of ethylene carbonate (EC), ethyl methyl carbonate (EMC), and dimethyl carbonate (DMC) in a volume ratio of 2:4:4.

<Formula 8>

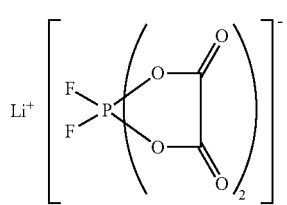

Preparation of Lithium Battery

Example 9

Preparation of Anode 97 weight % of graphite particles (MC20, manufactured by Mitsubishi Chemical Corporation), 1.5 weight % of BM408 (manufactured by Daicel Corporation) as a conductor, and 1.5 weight % of BM400-B (manufactured by Zeon Corporation) as a binder were mixed, added to distilled water, and then stirred for 60 minutes by using a mechanical stirrer to prepare a negative active material slurry. The slurry was applied at a thickness of about 60 μm on a copper current collector having a thickness of about 10 Pa by using a doctor blade, dried for about 0.5 hours by using a hot-air dryer at a temperature of about 100° C., dried again in vacuum for about 4 hours at a temperature of about 120° C. and then roll-pressed to prepare an anode plate. The anode had a mixture density (E/D) of about 1.55 g/cc and a loading level (L/L) of about 14.36 mg/cm².

Preparation of Cathode 94 weight % of Zr-coated $LiNi_{0.65}Co_{0.20}Mn_{0.15}O_2$ (NCM 65, manufactured by Samsung SDI), 3.0 weight % of Denka black as a conductor, and 3 weight % PVDF (Solef 6020, manufactured by Solvay) as a binder were mixed, added to N-methyl-2-pyrrolidone solvent, and then stirred for 30 minutes by a mechanical stirrer to prepare a positive active material slurry. The slurry was applied at a thickness of about 60 μm on an aluminum current collector having a thickness of about 20 μm by using doctor blade, dried for about 0.5 hours by using a hot-air dryer at a temperature of about 100° C., dried again in vacuum for about 4 hours at a temperature of about 120° C., and then roll-pressed to prepare a cathode plate. The cathode had a mixture density (E/D) of about 3.15 g/cc and a loading level (L/L) of about 27.05 mg/cm².

Battery Assembly

A ceramic-coated polyethylene separator having a thickness of about 16 μm (manufactured by SK Innovation Co., Ltd.) was used as a separator, and the organic electrolytic solution prepared in Example 1 above was used to manufacture a pouch-type lithium battery.

Examples 10 Through 16

Lithium batteries were manufactured in the same manner as in Example 9 except that each of the organic electrolytic solutions prepared in Examples 2 through 8 were used instead of the electrolytic solution prepared in Example 1.

Comparative Examples 8 Through 14

Lithium batteries were manufactured in the same manner as in Example 9 except that each of the organic electrolytic solutions prepared in Comparative Examples 1 through 7 were used instead of the electrolytic solution prepared in Example 1.

Evaluation Example 1

Measuring Viscosity

Viscosities of the organic electrolytic solutions prepared in Examples 1 through 8 and Comparative Examples 1 through 6 were measured and some of the results are shown in Table 1.

Viscosities were measured by using a viscometer SV-1A (A&D Company; Vibro viscometer).

TABLE 1

|  | Viscosity [cp] |
|---|---|
| Example 2 | 6.48 |
| Comparative Example 1 | 5.96 |
| Comparative Example 2 | 6.70 |
| Comparative Example 3 | 7.14 |
| Comparative Example 4 | 6.88 |
| Comparative Example 5 | 7.45 |
| Comparative Example 6 | 6.86 |

As shown in Table 1 above, a viscosity of the organic electrolytic solution prepared in Example 2 was significantly decreased compared to those of the organic electrolytic solutions prepared in Comparative Examples 2 through 6.

Evaluation Example 2

Evaluation of Charge and Discharge Characteristics at Room Temperature (25° C.)

The lithium batteries manufactured in Examples 9 through 16 and Comparative Examples 8 through 14 were charged at room temperature (25° C.) with a constant current at a rate of about 0.5 C until a voltage reached 4.20 V (vs. Li) and then cut-off at a current level at about a rate of 0.05 C while maintaining a constant voltage of about 4.20 V. Thereafter, the lithium batteries were discharged with a constant current at a rate of about 0.5 C until a voltage reached 2.80 V (vs. Li) (formation process, $1^{st}$ cycle).

The lithium batteries subjected to the formation process were charged at a temperature of about 25° C. and with a constant current at a rate of about 0.5 C until a voltage reached 4.20 V (vs. Li) and then cut-off with a current at about a rate of 0.05 C while maintaining a constant voltage at about 4.20 V. Thereafter, a cycle in which the lithium batteries were discharged with a constant current at about a rate of 1.5 C until a voltage reached 2.80 V (vs. Li) was repeated until the $200^{th}$ cycle.

Some of the results of the above charge and discharge evaluation are shown in Table 2 below. A capacity retention rate at the $200^{th}$ cycle is defined by Equation 1 below.

Capacity retention rate=[Discharge capacity in the $200^{th}$ cycle/discharge capacity in the $1^{st}$ cycle]× 100 <Equation 1>

Evaluation Example 3

Evaluation of Charge and Discharge Characteristics at High Temperature (45° C.)

The lithium batteries were charged and discharged in the same manner as in Evaluation Example 2 except the charge and discharge temperature was changed to about 45° C.

Some of the results of the charge and discharge evaluation results are shown in Table 2 below.

TABLE 2

|  | 25° C., Capacity retention rate in the $200^{th}$ cycle [%] | 45° C., Capacity retention rate in the $200^{th}$ cycle [%] |
|---|---|---|
| Example 9 | 96.3 | 94.6 |
| Example 10 | 96.3 | 94.6 |
| Example 11 | 96.1 | 95.9 |
| Example 12 | 95.8 | 95.2 |
| Example 13 | 97.0 | 94.9 |
| Example 14 | 96.2 | 95.8 |
| Example 15 | 95.8 | 94.9 |
| Example 16 | 98.1 | 96.4 |
| Comparative Example 8 | 92.8 | 93.8 |
| Comparative Example 9 | 93.6 | 94.7 |
| Comparative Example 10 | 92.2 | 93.0 |
| Comparative Example 11 | 93.9 | 94.0 |
| Comparative Example 12 | 94.3 | 93.3 |
| Comparative Example 13 | 93.5 | 95.1 |

Figure 1B:
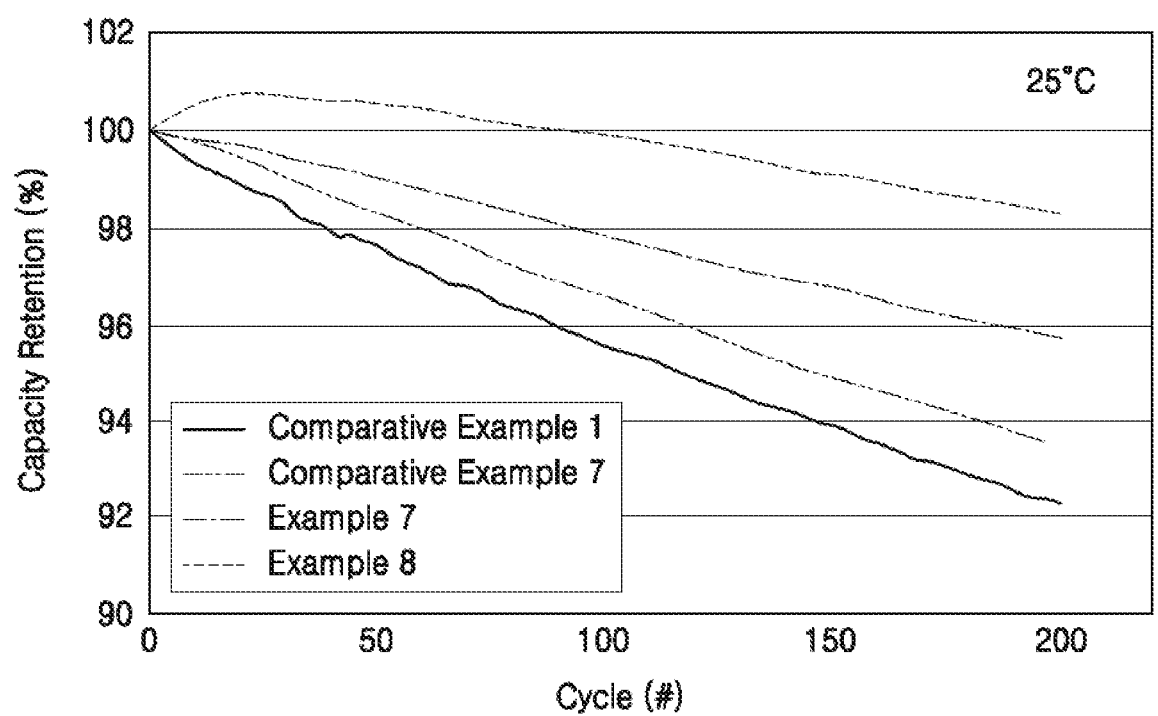
FIG. 1B is a graph showing lifespan characteristics of lithium batteries prepared in Examples 7 and 8 and Comparative Examples 1 and 7 at room temperature (25° C.)
Figure 1C:
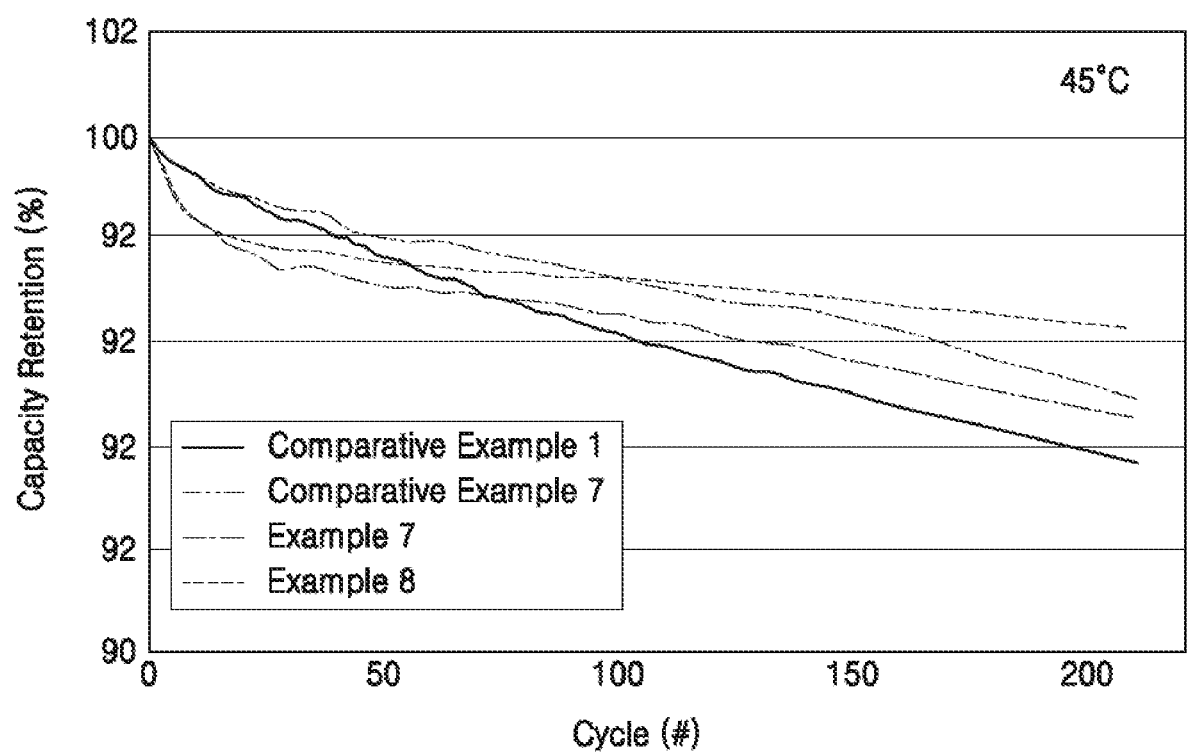
FIG. 1C is a graph showing lifespan characteristics of the lithium batteries prepared in Examples 7 and 8 and Comparative Examples 1 and 7 at high temperature (45° C.)

As shown in Table 2 and FIGS. 1a through 1c, the lithium batteries prepared in Examples 9 through 16 including the organic electrolytic solution of the present inventive concept showed improved lifespan characteristics at room temperature (25° C.) and high temperature (45° C.) as compared with the lithium batteries prepared in Comparative Examples 8 through 13 and not including the organic electrolytic solution of the present inventive concept.

Evaluation Example 4

Evaluation of Direct Current Resistance (DC IR) at High Temperature (45° C.)

Direct current resistances (DC IR) of the lithium batteries were measured by the following method.

The lithium batteries prepared in Examples 9 through 16 and Comparative Example 8 through 14 were charged at high temperature (45° C.), with a current at rate of 0.5 C in the first cycle until a voltage reached 50% of SOC, cut-off at a rate of 0.02 C, maintained under the same condition for 10 minutes, discharged with a constant current at a rate of 0.5 C for 30 seconds, maintained under the same condition for 30 seconds, discharged with a constant current at a rate of 0.5 C for 30 seconds, maintained under the same condition for 10 minutes, discharged with a constant current at a rate of 1.0 C for 30 seconds, maintained under the same condition for 30 seconds, discharged with a constant current level at a rate of 0.5 C for 1 minute, maintained under the same condition for 10 minutes, discharged with a constant current at a rate of 2.0 C for 30 seconds, maintained under the same condition for 30 seconds, discharged with a constant current at a rate of 0.5 C for 2 minutes, maintained under the same condition for 10 minutes, discharged with a constant current at a rate of 3.0 C for 30 seconds, maintained under the same condition for 30 seconds, discharged with a constant current at a rate of 0.5 C for 2 minutes, and then maintained under the same condition for 10 minutes.

An average voltage drop for each C-rate for 10 seconds is a direct current voltage.

Some of direct current resistance values are shown in Table 3 below.

TABLE 3

| | Increase in direct current resistance at high temperature (45° C.) [%] |
|---|---|
| Example 9 | 132 |
| Example 10 | 107 |
| Example 11 | 109 |
| Example 12 | 99 |
| Example 13 | 94 |
| Example 14 | 97 |
| Example 15 | 110 |
| Example 16 | 115 |
| Comparative Example 8 | 148 |
| Comparative Example 9 | 109 |
| Comparative Example 10 | 179 |
| Comparative Example 11 | 133 |
| Comparative Example 12 | 127 |
| Comparative Example 13 | 114 |

As shown in Table 3 above, the lithium batteries prepared in Examples 9 through 16 including the organic electrolytic solution of the present inventive concept showed a substantially lower rate of increase in direct current resistance at high temperature (45° C.) as compared with the lithium batteries prepared in Comparative Examples 8 through 13 and not including the organic electrolytic solution in the present invention.

Accordingly, it may be concluded that production of solid electrolytic interfaces have been inhibited in the lithium batteries prepared in the Examples.

Evaluation Example 4

Evaluation of Stability at High Temperature of 60° C.

During the first cycle, the lithium batteries manufactured in Examples 9 through 16 and Comparative Examples 8 through 13 were charged at room temperature (25° C.) and with a constant current at rate of about 0.5 C until a voltage reached 4.20 V, charged at a constant voltage of 4.20 V until a current reached 0.05 C, and then discharged with a constant current at rate of 0.5 C until a voltage reached 2.75 V.

During the second cycle, the lithium batteries were charged with a constant current at a rate of 0.5 C until a voltage reached 4.20 V, charged at constant voltage of 4.20 V until a current reached 0.05 C, and then discharged with a constant current at a rate of 0.2 C until a voltage reached 2.80 V.

During the third cycle, the lithium batteries were charged with a constant current at a rate of 0.5 C until a voltage reached 4.20 V, charged at constant voltage of 4.20 V until a current reached 0.05 C, and then discharged with a constant current at a rate of 0.2 C until a voltage reached 2.80 V. Discharge capacity in the third cycle was deemed as standard capacity.

During the fourth cycle, the lithium batteries were charged at a rate of 0.5 C until a voltage reached 4.20 V, charged at constant voltage of 4.20 V until a current reached 0.05 C, stored in a 60° C. oven for 60 days, and then the batteries were taken out and subjected to a fourth discharge cycle at a rate of 0.1 C until a voltage reached 2.75 V. Some of the charge and discharge results are shown in Table 4 below. Capacity retention rate after high temperature storage may be defined by Equation 2 below.

Capacity retention rate after high temperature storage [%]=[Discharge capacity after high temperature exposure in the fourth cycle/standard capacity]×100    <Equation 2>

(The standard capacity is the discharge capacity in the third cycle)

TABLE 4

| | Capacity retention rate after storage for 60 days [%] |
|---|---|
| Example 9 | 86.78 |
| Example 10 | 86.28 |
| Example 11 | 86.74 |
| Example 12 | 87.09 |
| Example 13 | 86.27 |
| Example 14 | 88.08 |
| Example 15 | 88.46 |
| Example 16 | 89.72 |
| Comparative Example 8 | 83.22 |
| Comparative Example 9 | 84.59 |
| Comparative Example 10 | 83.43 |
| Comparative Example 11 | 85.20 |
| Comparative Example 12 | 85.60 |
| Comparative Example 13 | 85.98 |

As shown in Table 4 above, the lithium batteries manufactured in Examples 9 through 16 including the organic electrolytic solution of the present inventive concept showed substantially increased stability at high temperature as compared with the lithium batteries manufactured in Comparative Examples 8 through 13 and not including the organic electrolytic solution of the present inventive concept.

Evaluation Example 5

Evaluation of the Amount of Gas Produced

With respect to the lithium batteries manufactured in Examples 9 through 16 and Comparative Examples 8 through 14, the amounts of gas produced were measured during the evaluation of lifespan characteristics at high temperature (45° C.), and some of the evaluation results are shown in Table 5 below. The cells that had completed the lifespan characteristics evaluation were placed in a jig, popped, and then changes in internal gas pressure of the jig were converted into volume to measure the amount of gas produced.

TABLE 5

| | Amount of gas produced [ml] |
|---|---|
| Example 13 | 0.79 |
| Comparative Example 14 | 2.12 |

As shown in Table 5 above, the lithium battery manufactured in Example 13 including the organic electrolytic solution of the present inventive concept showed a substantially lower amount of gas produced as compared with the lithium battery manufactured in Comparative Example 14 and not including the organic electrolytic solution of the present inventive concept.

While the inventive concept has been particularly shown and described with reference to example embodiments thereof, it will be understood that various changes in form and details may be made therein without departing from the spirit and scope of the following claims.

INDUSTRIAL APPLICABILITY

Lifespan characteristics of a lithium battery may be improved by using an organic electrolytic solution of a novel composition.

The invention claimed is:

1. An organic electrolytic solution for battery consisting of:
an organic solvent;
a lithium salt;
a borate compound represented by Formula 1 below; and
an ionic metal complex represented by Formula 2 below:

<Formula 1>

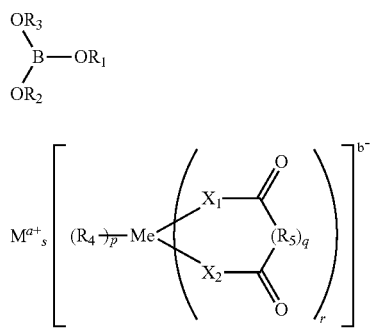

<Formula 2>

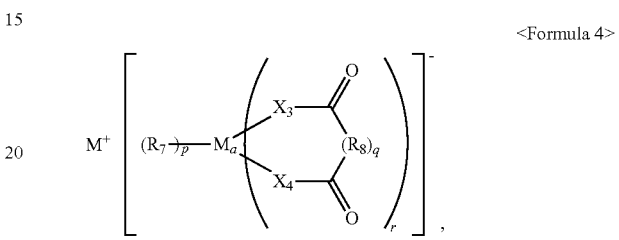

wherein,
$R_1$, $R_2$, and $R_3$ are each independently a hydrogen; an unsubstituted $C_1$-$C_5$ alkyl group; or a $C_1$-$C_5$ cyanoalkyl group substituted or unsubstituted with a halogen,
at least one of the $R_1$, $R_2$, and $R_3$ comprises a cyanoalkyl group,
Me is an element selected from the group consisting of transition metals and Groups 13 to 15 elements of the periodic table,
M is a metal ion,
a is an integer from 1 to 3, b is an integer from 1 to 3, s=b/a,
p is an integer from 0 to 8, q is 0 or 1, r is an integer from 1 to 4,
$X_1$ and $X_2$ are each independently O, S, or $NR_6$,
$R_4$ and $R_6$ are each independently a halogen, a $C_1$-$C_5$ alkyl group substituted or unsubstituted with a halogen, or a $C_1$-$C_5$ aryl group substituted or unsubstituted with a halogen, and
$R_5$ is a $C_1$-$C_5$ alkylene group substituted or unsubstituted with a halogen or a $C_4$-$C_{10}$ arylene group substituted or unsubstituted with a halogen,
wherein an amount of the borate compound is about 0.1 weight % to about 10 weight % based on the total weight of the organic electrolytic solution, and
wherein the organic solvent is one or more selected from the group consisting of dialkyl carbonate, cyclic carbonate, linear or cyclic ester, linear or cyclic amide, aliphatic nitrile, linear or cyclic ether, and derivatives thereof.

2. The organic electrolytic solution of claim 1, wherein the borate compound is represented by Formula 3 below:
wherein Rio is a $C_1$-$C_5$ cyanoalkyl group substituted or unsubstituted with a halogen.

3. The organic electrolytic solution of claim 1, wherein the borate compound is tricyanomethylborate, tricyanoethylborate, tricyanopropylborate, or tricyanobutyl borate.

4. The organic electrolytic solution of claim 1, wherein the ionic metal complex is represented by Formula 4 below:

<Formula 4>

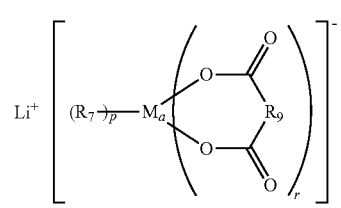

wherein
$M_a$ is Al, B, or P,
M is a metal ion,
p is an integer from 0 to 8, q is 0 or 1, r is an integer from 1 to 4,
$X_3$ and $X_4$ are each independently O or S,
$R_7$ is a halogen, and
$R_8$ is a $C_1$-$C_5$ alkylene group substituted or unsubstituted with a halogen or a $C_4$-$C_{10}$ arylene group substituted or unsubstituted with a halogen.

5. The organic electrolytic solution of claim 1, wherein the ionic metal complex is represented by Formula 5 or 6 below:

<Formula 5>

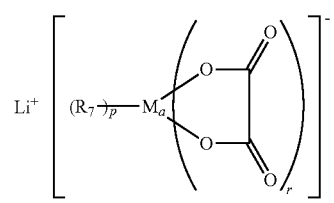

<Formula 6> wherein
$M_a$ is Al, B, or P,
p is an integer from 0 to 8, r is an integer from 1 to 4,
R7 is a halogen, and
$R_9$ is a $C_1$-$C_5$ alkylene group substituted or unsubstituted with a halogen.

6. The organic electrolytic solution of claim 1, wherein the ionic metal complex is represented by one of Formulae 7 to 12 below:

<Formula 7>
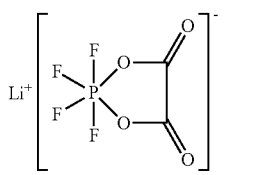

<Formula 8>
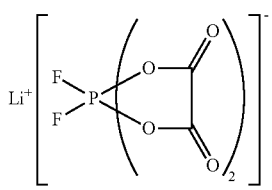

<Formula 9>
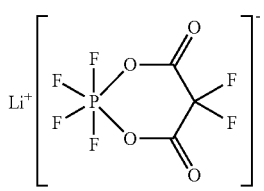

<Formula 10>
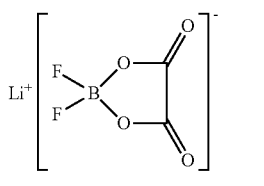

<Formula 11>
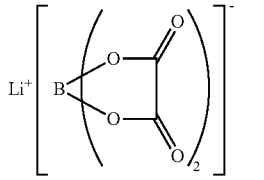

<Formula 12>
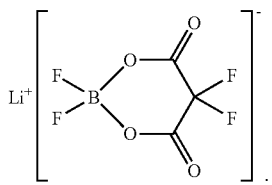

7. The organic electrolytic solution of claim 1, wherein an amount of the ionic metal complex is about 0.1 weight % to about 10 weight % based on the total weight of the organic electrolytic solution.

8. The organic electrolytic solution of claim 1, wherein the organic solvent comprises a solvent having a boiling point of about 200° C. or less.

9. The organic electrolytic solution of claim 1, wherein the organic solvent comprises one or more selected from the group consisting of dimethyl carbonate (DMC), ethyl methyl carbonate (EMC), methyl propyl carbonate, ethyl propyl carbonate, diethyl carbonate (DEC), dipropyl carbonate, propylene carbonate (PC), ethylene carbonate (EC), butylene carbonate, ethyl propionate, ethyl butyrate, acetonitrile, succinonitrile (SN), dimethylsulfoxide, dimethylformamide, dimethylacetamide, gamma-valerolactone, gamma-butyrolactone, and tetrahydrofuran.

10. The organic electrolytic solution of claim 1, wherein lithium salt in the organic electrolytic solution is one or more selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO2)$ (where x and y are each an integer from 1 to 20), LiCl, and LiI.

11. The organic electrolytic solution of claim 1, wherein the lithium salt in the organic electrolytic solution is $LiPF_6$.

12. The organic electrolytic solution of claim 1, wherein a concentration of the lithium salt in the organic electrolytic solution is about 0.01 M to about 2.0 M.

13. A lithium battery comprising:
a cathode;
an anode; and
the organic electrolytic solution of claim 1.

14. The lithium battery of claim 13, wherein the cathode comprises nickel.

15. The lithium battery of claim 13, wherein the anode comprises graphite.

16. An organic electrolytic solution for battery consisting of:
an organic solvent;
a lithium salt;
a borate compound represented by Formula 1 below;
an ionic metal complex represented by Formula 2 below:

<Formula 1><Formula 2>

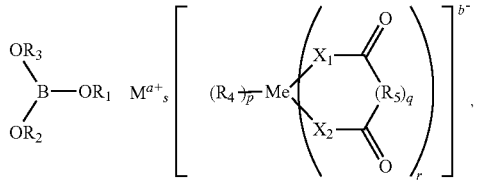

and a fluorine-based compound represented by Formula 13 below:

<Formula 13>

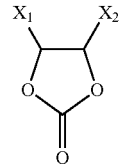

wherein in Formulae 1, 2 and 13,
$R_1$, $R_2$, and $R_3$ are each independently a hydrogen; an unsubstituted $C_1$-$C_5$ alkyl group; or a $C_1$-$C_5$ cyanoalkyl group substituted or unsubstituted with a halogen,
at least one of the $R_1$, $R_2$, and $R_3$ comprises a cyanoalkyl group,
Me is an element selected from the group consisting of transition metals and Groups 13 to 15 elements of the periodic table,
M is a metal ion,
a is an integer from 1 to 3, b is an integer from 1 to 3, s=b/a,
p is an integer from 0 to 8, q is 0 or 1, r is an integer from 1 to 4,
$X_1$ and $X_2$ are each independently O, S, or $NR_6$,
$R_4$ and $R_6$ are each independently a halogen, a $C_1$-$C_5$ alkyl group substituted or unsubstituted with a halogen, or a $C_1$-$C_5$ aryl group substituted or unsubstituted with a halogen, and $R_5$ is a $C_1$-$C_5$ alkylene group substituted or unsubstituted with a halogen or a $C_4$-$C_{10}$ arylene group substituted or unsubstituted with a halogen, wherein $X_1$ and $X_2$ are each independently a hydrogen; a halogen; a $C_1$-$C_2$ alkyl group substituted or unsubstituted with a halogen, and at least one of $X_1$ and $X_2$ comprises a fluorine atom, wherein an amount of the borate compound is about 0.1 weight % to about 10 weight % based on the total weight of the organic electrolytic solution, and wherein the organic solvent is one or more selected from the group consisting of dialkyl carbonate, cyclic carbonate, linear or cyclic ester, linear or cyclic amide, aliphatic nitrile, linear or cyclic ether, and derivatives thereof.

17. The organic electrolytic solution of claim 16, wherein the fluorine-based compound is represented by one of Formulae 14 and 15 below:

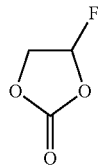

<Formula 14>

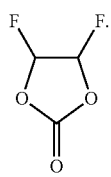

<Formula 15>

18. The organic electrolytic solution of claim 9, wherein an amount of the fluorine-based compound is about 0.1 weight % to about 10 weight % based on the total weight of the organic electrolytic solution.

* * * * *

UNITED STATES PATENT AND TRADEMARK OFFICE
CERTIFICATE OF CORRECTION

| | |
|---|---|
| PATENT NO. | : 11,251,465 B2 |
| APPLICATION NO. | : 15/309318 |
| DATED | : February 15, 2022 |
| INVENTOR(S) | : Myung Heui Woo et al. |

Page 1 of 1

It is certified that error appears in the above-identified patent and that said Letters Patent is hereby corrected as shown below:

In the Claims

Column 24, Line 5, Claim 2      After "below:", Insert --$B(OR_{10})_3$,--

Column 24, Line 6, Claim 2      Delete "Rio", Insert --$R_{10}$--

Column 26, Line 3, Claim 10      Delete "$(C_yF_{2y+1}SO2)$", Insert --$(C_yF_{2y+1}SO_2)$--

Signed and Sealed this
Second Day of May, 2023

Katherine Kelly Vidal
*Director of the United States Patent and Trademark Office*